United States Patent Office 3,313,570
Patented Apr. 11, 1967

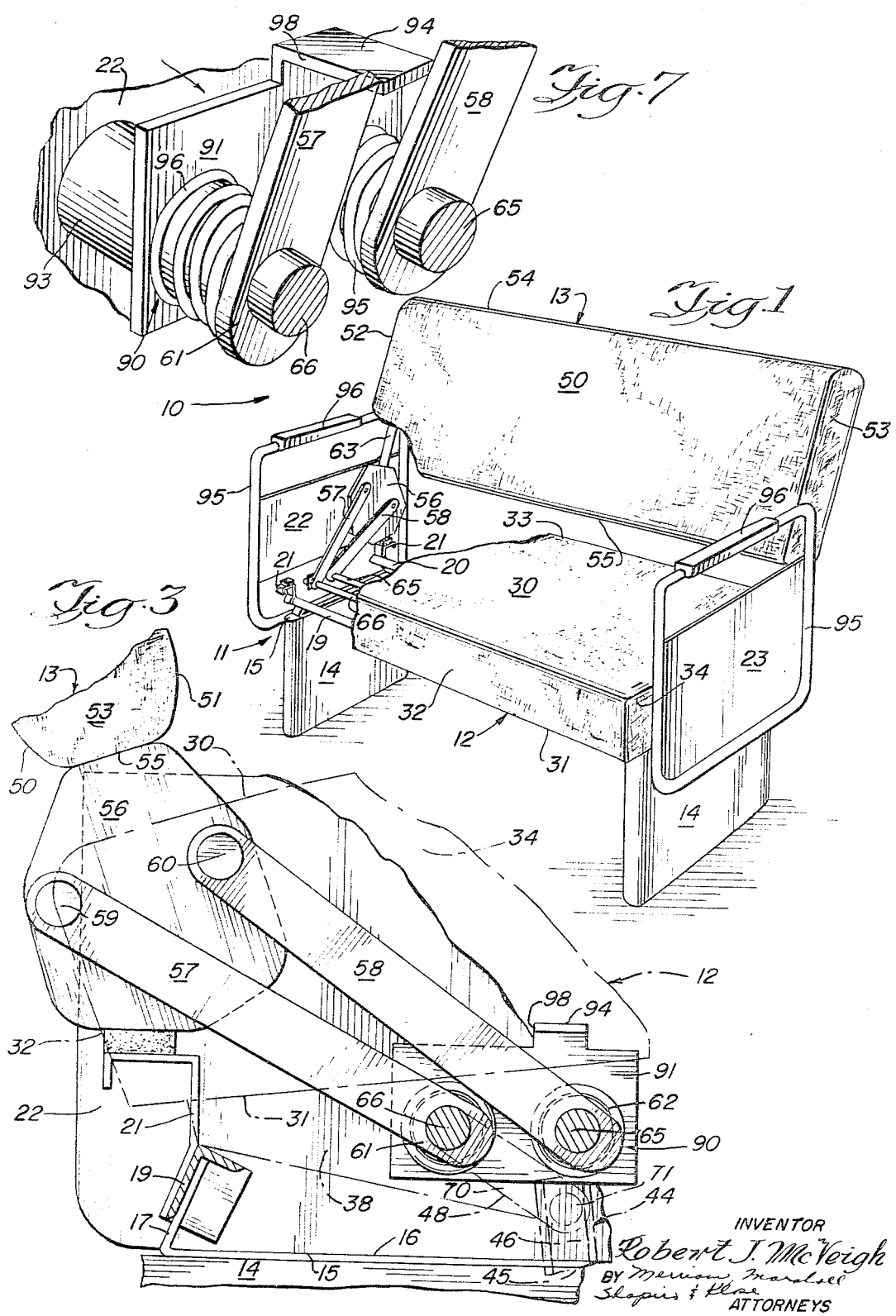

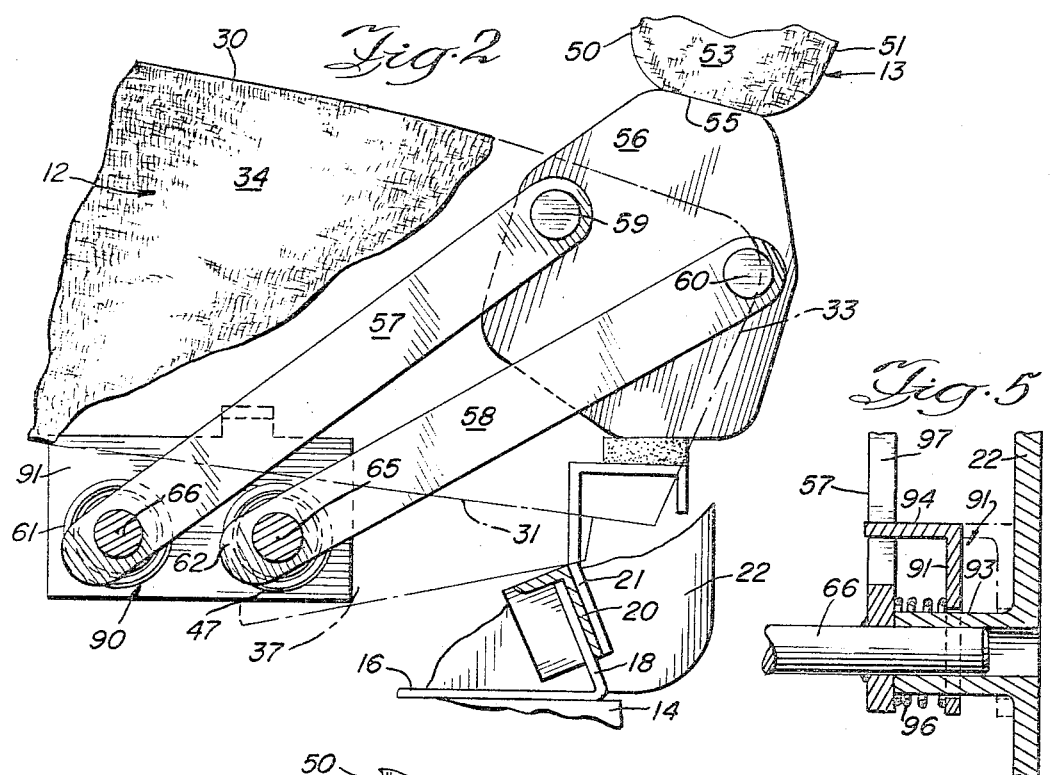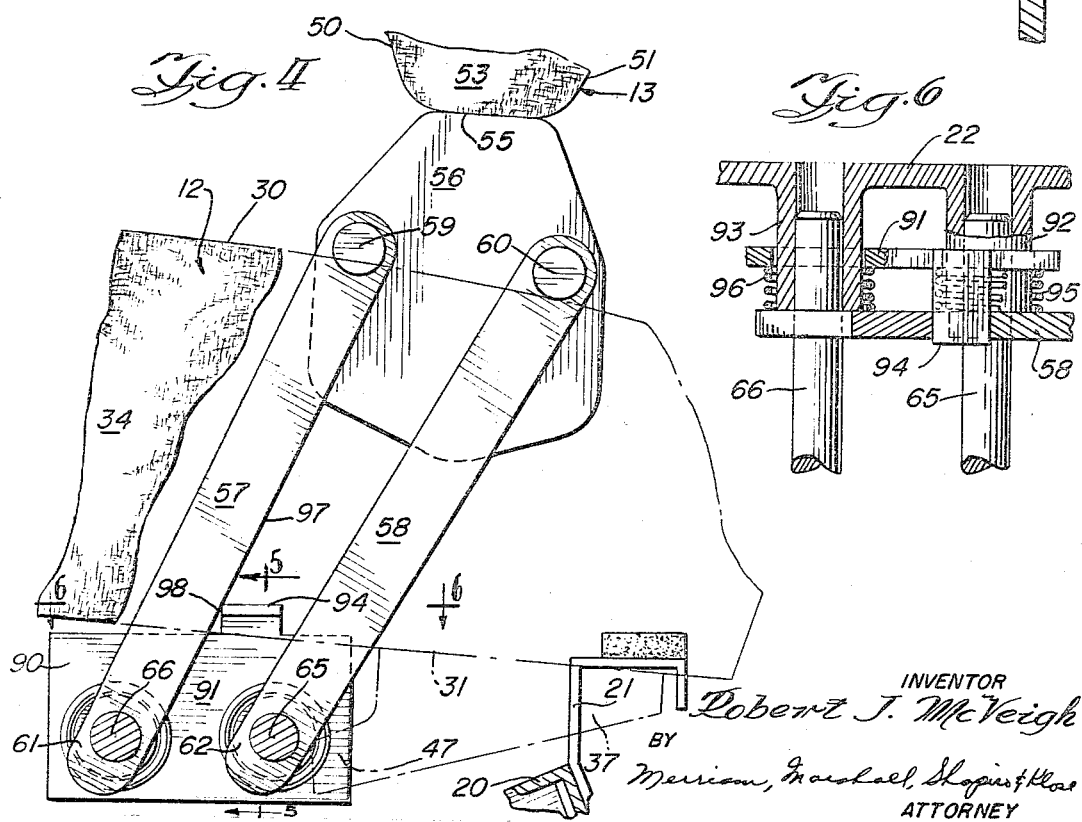

3,313,570
LATCH FOR BACK OF WALK-OVER SEAT
Robert J. McVeigh, Oak Lawn, Ill., assignor to Coach and Car Equipment Corporation, Chicago, Ill., a corporation of Illinois
Filed Feb. 3, 1966, Ser. No. 524,689
7 Claims. (Cl. 297—103)

The present invention relates generally to walk-over seats, and more particularly to a walk-over seat having a seat cushion which is normally not removable from the seat frame, to forestall theft and vandalism, and having means operable to permit ready removal of the seat cushion for servicing of the seat.

Walk-over seats, generally, are typically used on mass transit vehicles such as subway cars and commuter trains. A walk-over seat is a seat in which the seat back is movable, from a first supporting or terminal position, at one end of the seat cushion, along a vertically arcuate path across the top of the seat cushion to a second supporting or terminal position at the other end of the seat cushion, with the seat back remaining in a substantially vertical disposition throughout said movement. A walk-over seat is generally provided with a linkage, between the seat back and the seat cushion, which changes the inclination of the seat cushion, in response to movement of the seat back, so that the cushion is inclined slightly downwardly toward the seat back no matter which supporting position the seat back occupies. As a result, the direction in which the seat faces may be changed merely by moving the seat back between its first and second positions. The walk-over seat with which the present invention is associated includes means for preventing removal of the seat cushion from the seat frame when the seat back is in either of its two supporting positions, while permitting removal with ease when the seat back is in a predetermined intermediate position located above the seat cushion. This minimizes theft and vandalism, problems not uncommon on mass transit facilities.

It is oftentimes desirable to remove the seat cushion during servicing of the seat, and this often requires holding the seat back in its predetermined intermediate position. Otherwise, the seat back may fall, of its own accord, arcuately downwardly back to one of its supporting positions. To hold the seat back manually would require another man in addition to the man removing the seat cushion.

To facilitate removal of the seat cushion, the seat includes manually operable means for retaining the seat back in said predetermined intermediate position; and, in accordance with the present invention, the retaining means is normally urged to a non-locking or non-retaining position to permit ready release thereof and to facilitate the return of the seat back to a supporting position once the seat cushion has been removed.

Other features and advantages are inherent in the structure claimed and disclosed or will become apparent to those skilled in the art from the following diagrammatic drawings wherein:

FIGURE 1 is a perspective, partially cut away, of a walk-over seat including an embodiment of retaining means constructed in accordance with the present invention;

FIGURE 2 is a fragmentary elevational view of the seat, partially cut away and partially in section, showing the seat back in one position for supporting the back of a seat occupant, and showing an embodiment of the retaining means in a non-locking position;

FIGURE 3 is a fragmentary elevational view, partially cut way and partially in section, showing the seat back in the other of its supporting positions, and showing said retaining means in its non-locking position;

FIGURE 4 is a fragmentary elevational view, partially cut away and partially in section, showing the seat back in its predetermined intermediate position for permitting removal of the seat cushion from the seat frame, and showing the retaining means in a locking position;

FIGURE 5 is a sectional view taken along lines 5—5 in FIGURE 4;

FIGURE 6 is a sectional view taken along lines 6—6 in FIGURE 4; and

FIGURE 7 is an enlarged perspective illustrating the retaining means in a locking position.

Referring initially to FIGURE 1, there is shown an embodiment of a walk-over seat constructed in accordance with the present invention and indicated generally at 10. Seat 10 includes a frame, a seat cushion and a seat back indicated generally at 11, 12 and 13, respectively. In FIGURE 1, seat back 13 is disposed in a first position, at a first end 33 of seat cushion 12, for supporting the back of an occupant of seat 10.

Seat back 13 is connected to frame 11 and mounted for movement, along a vertically arcuate path having a horizontal directional component, between the first supporting position, shown in FIGURES 1 and 2, and a second supporting position shown in FIGURE 3 wherein the seat back is at a second end 32 of seat cushion 12. When the seat back is in its first and second supporting positions of FIGURES 2 and 3, respectively, seat cushion 12 is in first and second inclined positions, respectively, illustrated in FIGURES 2 and 3.

FIGURE 4 illustrates seat back 13 in a predetermined intermediate position, between its first and second supporting or terminal positions. Seat cushion 12 cannot be readily removed from seat frame 11 unless seat back 13 is in said intermediate position; and the seat back may be held in this position by releasable retaining means indicated generally at 90.

The embodiment illustrated in the drawings will now be described with greater specificity.

Referring to FIGURES 1–4, frame 11 includes a pair of legs 14, 14 each having a top 15 supporting a strip 16 having a pair of flanges 17, 18 inclined upwardly toward each other at opposite ends of strip 16. Each flange 17, 18 supports an L-shaped, longitudinally extending member 19, 20, said members 19, 20 constituting the cushion support means of frame 11.

Attached to each of the opposite ends of both frame members 19, 20 are brackets 21 in turn fixed to opposite sides 22, 23 of frame 11.

The periphery of each frame side 22, 23 is defined by a vertically disposed, rectangular member 95 having an arm rest 96 along the upper side thereof (FIG. 1).

Seat cushion 12 includes a top 30, a bottom 31, opposite first and second ends 33, 32, respectively, and sides 34. The opposite ends 32, 33 of seat cushion 12 each extend between opposite sides 22, 23 of seat frame 11.

Fixed to the bottom 31 of seat cushion 12, adjacent each cushion side 34 is a pair of separate, discrete, wedge-shaped, support-engaging members indicated generally in dash-dot lines at 37, 38.

Support-engaging members 38 rest atop frame member 19 and support-engaging members 37 rest atop the other frame member 20, when cushion 12 rests on frame 11.

Each of members 37 is cut away at an innermost part of the member to define a hook portion 47; and each of members 38 is cut away at an innermost part of the member to define a hook portion 48.

Referring to FIGURE 3, attached to the remaining innermost part of each member 38 is a vertically disposed member 44 having a channel-shaped, horizontal cross section with an open bottom end 45 and an open side 46 (FIG. 3). The channel of each channel-shaped member 44 faces a respective frame side 22, 23 to which the member 44 is most closely adjacent.

Referring to FIGURES 1–4, seat back 13 includes a pair of opposed surfaces 50, 51. When seat back 13 is in the position of FIGURE 2, surface 50 contacts the back of an occupant of seat 10; and when seat back 13 is in the position of FIGURE 3, surface 51 is the contacting surface. Back 13 also includes a pair of opposed side ends 52, 53, a top 54 and a bottom 55.

Each side end 52, 53 of seat back 13 is connected by a member 63 (FIG. 1) to a polygonal plate 56 constituting part of a linkage attaching seat back 13 to seat frame 11 and connecting the seat back to the seat cushion for movement of the latter in response to movement of the former.

The linkage is the same at each opposite side end 52, 53 of the seat back and attaches a respective side end 52, 53 to a corresponding side 22, 23 of seat frame 11.

As shown in FIGURES 1–4, in addition to plate 56, the linkage includes, at each side, a pair of levers 57, 58 each having a respective upper pivotal mounting 59, 60 on plate 56 and a respective lower end 61, 62 pivotally mounted on the most closely adjacent frame side.

Extending between frame sides 22, 23 are a pair of shafts 65, 66 each having opposite ends fixed between levers 57 or levers 58, respectively.

Each of shafts 65, 66 constitutes a horizontally disposed, elongated seat back stabilizing member, connected, through their corresponding levers, to both side ends 52, 53 of the seat back; and both stabilizing members are connected to opposite sides 22, 23 of the seat frame by virtue of the pivotal connections of the lower ends 61, 62 of the levers 57, 58 to the frame sides 22, 23. In this manner, shafts 65, 66 impart stability to seat back 13 during movement thereof. Accordingly, twisting and distortion of the seat back during its movement are minimized, and movement is thus facilitated.

During movement of the seat back, levers 57, 58 pivot about their mountings on the frame sides; and shafts 65, 66 rotate as levers 57, 58 pivot.

As the position of seat back 13 changes from that shown in FIGURE 2 to that shown in FIGURE 3, the inclination of seat cushion 12 changes from that shown in FIGURE 2 to that shown in FIGURE 3; and the movement of seat back 13 and seat cushion 12 are coordinated by linkage parts now to be described.

Referring to FIGURE 3, fixed to shaft 66, and extending radially therefrom, is a link 70 terminating at a free end near which is fixed one end of a pin 71 extending horizontally from link 70 and terminating at a free end thereof. The free end of pin 71 slidably engages within vertically disposed, channel-shaped member 44 on support-engaging members 38 of cushion 12 when the seat back and the seat cushion are in the positions shown in FIGURES 2 and 3 and the intermediate positions therebetween.

When seat back 13 and seat cushion 12 are in the position of FIGURE 2, hook portions 47 on support-engaging members 37 engage beneath shaft 65, and prevent removal of seat cushion 12 from seat frame 11. When seat back 13 and seat cushion 12 are in the position illustrated in FIGURE 3, hook portions 48 on support-engaging members 38 engage beneath shaft 66 to prevent removal of seat cushion 12 from seat frame 11.

During movement of seat back 13 and seat cushion 12 from the position of FIGURE 2 to the position of FIGURE 3, hook portions 47 become disengaged from beneath shaft 65 and hook portions 48 become engaged beneath shaft 66, and the opposite occurs during movement from the position of FIGURE 3 to the position of FIGURE 2.

In most of the intermediate positions between those of FIGURES 2 and 3, removal of seat cushion 12 from the seat frame is not readily done. However, there is an intermediate position between that of FIGURE 2 and that of FIGURE 3 in which neither hook portions 47 nor hook portions 48 are engaged beneath their respective shafts 65, 66; and in this predetermined intermediate position, illustrated in FIGURE 4, seat cushion 12 can be readily removed from seat frame 11.

In order to facilitate removal of seat cushion 12 from seat frame 11 (e.g., for purposes of seat maintenance and cleaning, or the like), means are provided, in accordance with the present invention, to maintain seat back 13 and seat cushion 12 in the predetermined intermediate position of FIGURE 4.

Referring to FIGURES 2–7, indicated generally at 90 is means for retaining the seat back in its predetermined intermediate position. Retaining means 90 is in the form of an element slidably mounted on a pair of bosses 92, 93 extending inwardly from frame side 22. Pivotally mounted within bosses 92, 93 are extensions of shafts 65, 66, said extensions being located between frame side 22 and levers, 57, 58 and constituting, with bosses 92, 93, the lower pivotal mounting of levers 57, 58 on frame side 22. The retaining element is slidably moveable, along the same axes as those about which the levers pivot, between one position relatively close to the levers (illustrated in solid lines in FIG. 5) and another position relatively distant from the levers (illustrated in dash-dot lines in FIG. 5).

Element 90 includes a vertically disposed planar part 91, and extending horizontally from the top of part 91, toward levers 65, 66, is planar part 94 constituting latch means for the element.

Latch means 94 is located to extend between levers 57, 58 when the seat back and the levers are in the predetermined intermediate position of FIGURE 4 and the element is in its relatively close position illustrated in solid lines in FIGURE 5. In this location, a side edge 98 on latch means 94 engages a side edge 97 on lever 57 and locks the levers and the seat back in the predetermined intermediate position.

When the retaining element is in its relatively distant or retracted position (illustrated in dash-dot lines in FIG. 5), latch means 94 is located so that it is incapable of engaging either of the levers.

The retaining element is normally urged to the relatively distant position by a pair of coil springs 95, 96 disposed around bosses 92, 93, respectively, and located between the levers and the retaining element.

The engagement of latch edge 98 with lever edge 97 holds the retaining element in its relatively close position against the urging of springs 95, 96.

To return the retaining element to its relatively distant position, one need merely move levers 57, 58 and seat back 13 slightly to the left, as viewed in FIGURE 4. This disengages lever edge 97 from latch edge 98, and springs 95, 96 return the retaining element to its retracted position. The seat back and levers may then be moved to any position desired.

Mounting the retaining element on both bosses 92, 93 prevents rotation of the element about the axis of either boss and confines movement of the element to sliding along said bosses. Accordingly, latch means 94 is always in the relative disposition illustrated in the figures.

When the levers are in the positions of FIGURE 2 or FIGURE 3 or most of the intermediate positions therebetween, latch means 94 is not in horizontal alignment with the space between levers 57, 58 and thus cannot be slidably moved to a location therebetween. It is substantially only when the levers are in the predetermined intermediate position of FIGURE 4 that this can be done.

To facilitate entry of latch means 94 between the levers, the width of the latch means (measured from left to right in FIG. 4) is less than the horizontal distance between the levers (measured from left to right in FIG 4).

Thus, with a seat having retaining means as described above, only one man is required to hold the seat back in the predetermined intermediate position while removing the seat cushion for servicing of the seat.

The foregoing detailed description has been given for clearness of understanding only, and no unnecessary limitations should be understood therefrom, as modifications will be obvious to those skilled in the art.

What is claimed is:

1. In a walk-over seat comprising:
   frame means including a pair of spaced frame sides;
   a seat cushion having a first end and a second end each extending between said frame sides;
   said frame means including means for supporting said seat cushion in an occupant-accommodating position;
   a pair of upwardly extending levers each having a lower portion located adjacent one of said frame sides;
   means mounting the lower portions of each of said levers for pivotal movement about a respective axis extending horizontally between the lower portion of a respective lever and said one frame side;
   means pivotally connecting together an upper portion of each of said levers, whereby the levers together may be pivotally moved between a first terminal position in which said upper portions are at the first end of said seat cushion and a second terminal position in which the upper portions are at the second end of the seat cushion;
   and means for preventing removal of the seat cushion from its occupant-accommodating position when the levers are in their first or second position and for permitting removal of the seat cushion when the levers are in a predetermined intermediate position located between said first and second terminal position;
   the improvement comprising manually operable means for retaining the levers in said predetermined intermediate position, said manually operable retaining means comprising:
   an element;
   means connected to said one frame side mounting said element for slidable movement, in the direction of said horizontally extending axes, between one position relatively close to said levers and another position relatively distant from said levers;
   said element including latch means located to engage one of said levers when the levers are in said intermediate position and said element is in said relatively close position;
   and means normally operable to urge said element to said relatively distant opsition wherein the latch means occupies a location at which the latch means is incapable of engaging a lever;
   said one lever including means for holding said element against the urging of said normally operable means, releasable in response to movement of said one lever toward one of said terminal positions, when the one lever engages said latch means.

2. In a walk-over seat as recited in claim 1 wherein:
   said latch means is located to extend between said levers when the levers are in said intermediate position and the element is in the relatively close position;
   the location of said latch means renders the latch means incapable of extending between said levers when the levers are in substantially other than said intermediate position.

3. In a walk-over seat as recited in claim 1 wherein:
   said latch means protrudes from said element in a direction having a horizontal component extending in the same direction as said axes;
   said levers being spaced apart a predetermined distance, measured in a horizontal direction transverse to said horizontal directional component of the latch means, when the levers are in said intermediate position thereof;
   said latch means having a width, measured in the same horizontal direction as said predetermined distance between the levers, less than said predetermined distance.

4. In a walk-over seat as recited in claim 1 wherein:
   said means for slidably mounting the element comprises means mounting said element for slidable movement along both of said axes simultaneously.

5. In a walk-over seat:
   frame means including a frame side;
   an upwardly extending lever having a portion located adjacent said frame side;
   means mounting said lever for pivotal movement, between first and second terminal positions, about an axis extending horizontally between said lever portion and said frame side;
   an element;
   means, connected to said frame side, mounting said element for movement between one position, relatively close to said lever, and another position relatively distant from said lever;
   said element including latch means located to engage said lever when the lever is in an intermediate position, located between said first and second terminal positions, and said element is in said relatively close position;
   and means normally operable to urge said element to said relatively distant position wherein the latch means occupies a location at which the latch means is incapable of engaging the lever;
   said lever including means, releasable in response to movement of said lever toward one of said terminal positions, for holding said element against the urging of said normally operable means when the lever is engaged by said latch means.

6. In a walk-over seat as recited in claim 5 wherein:
   said mounting means for said element comprises means mounting the element for movement along said horizontally extending axis.

7. In a walk-over seat as recited in claim 6 wherein:
   said mounting means for said element includes means for confining movement of said element to sliding movement along said axis.

References Cited by the Examiner

UNITED STATES PATENTS

| | | | |
|---|---|---|---|
| 684,747 | 10/1901 | Cole | 297—94 |
| 1,231,205 | 6/1917 | Schechter | 297—103 X |
| 1,298,823 | 4/1919 | Taylor | 297—103 X |
| 1,968,434 | 7/1934 | Bell | 297—103 X |
| 3,150,897 | 9/1964 | Higley | 297—103 |

FRANK B. SHERRY, *Primary Examiner.*

JAMES T. McCALL, *Examiner.*